United States Patent
Anderson et al.

(10) Patent No.: US 6,800,353 B1
(45) Date of Patent: Oct. 5, 2004

(54) SCRATCH-RESISTANT STRIPPABLE FINISH

(75) Inventors: Bryan Michael Anderson, Saint Paul, MN (US); Keith Edward Olson, Apple Valley, MN (US); Helmut J. Kammerer, Fairlawn, OH (US); Thomas W. Richardson, Aurora, OH (US)

(73) Assignee: Ecolab Inc., St. Paul, MN (US)

( * ) Notice: Subject to any disclaimer, the term of this patent is extended or adjusted under 35 U.S.C. 154(b) by 393 days.

(21) Appl. No.: 09/657,420

(22) Filed: Sep. 8, 2000

(51) Int. Cl.$^7$ .............................. D06N 7/04; B32B 7/02; B32B 18/00
(52) U.S. Cl. ........................ 428/141; 428/143; 428/212; 428/325; 428/332; 428/908.8; 522/83; 522/84; 522/85; 522/86
(58) Field of Search .............................. 428/908.8, 143, 428/212, 325, 332, 141; 522/83, 84, 85, 86

(56) References Cited

U.S. PATENT DOCUMENTS

| | | | |
|---|---|---|---|
| 4,414,128 A | 11/1983 | Goffinet | 252/111 |
| 4,442,177 A | 4/1984 | Noda et al. | 428/412 |
| 4,482,656 A | 11/1984 | Nguyen et al. | 523/212 |
| 4,539,351 A | 9/1985 | O'Malley et al. | 524/43 |
| 4,562,219 A | 12/1985 | Frye | 524/91 |
| 4,624,971 A | 11/1986 | van Tao et al. | 522/37 |
| 4,680,237 A * | 7/1987 | Kenney et al. | 428/520 |
| 4,891,073 A | 1/1990 | Shortt et al. | 134/20 |
| 5,075,348 A | 12/1991 | Revis et al. | 522/84 |
| 5,086,087 A | 2/1992 | Misev | 522/84 |
| 5,126,394 A | 6/1992 | Revis et al. | 524/548 |
| 5,221,560 A | 6/1993 | Perkins et al. | 427/515 |
| 5,296,295 A | 3/1994 | Perkins et al. | 428/412 |
| 5,342,551 A | 8/1994 | Ruckle | 252/548 |
| RE34,992 E | 7/1995 | Revis et al. | 522/84 |
| 5,783,303 A * | 7/1998 | Tsuei | 428/354 |

(List continued on next page.)

FOREIGN PATENT DOCUMENTS

| | | |
|---|---|---|
| CA | 1 207 932 | 7/1986 |
| EP | 0 038 640 | 10/1981 |
| EP | 0 050 996 | 5/1982 |
| EP | 0 270 888 A2 | 11/1987 |
| EP | 0 424 006 | 4/1991 |

(List continued on next page.)

OTHER PUBLICATIONS

Report Summary: "Superhard Transparent Coatings: Polymeric sheet transparencies can be coated with suspensions of submicron particles for greater scratch and wear resistance," printed from library.northernlight.com on May 2, 2000.

(List continued on next page.)

Primary Examiner—Harold Pyon
Assistant Examiner—Patricia L. Nordmeyer
(74) Attorney, Agent, or Firm—IPLM Group, P.A.

(57) ABSTRACT

A jobsite-applied radiation curable floor finish containing inorganic particles can be applied to a multipiece flooring material whose pieces have a top surface, a side surface or surfaces and gaps between pieces. The top surface is coated and at least the uppermost portion of the gaps are filled with a layer or layers of cured finish composition comprising radiation cured polymer and sufficient inorganic filler particles to impart increased scratch resistance to the cured finish. The finish can also be applied as a strip agent-permeable coating atop a strippable intermediate coating atop a substrate.

40 Claims, 1 Drawing Sheet

U.S. PATENT DOCUMENTS

| | | | |
|---|---|---|---|
| 5,854,187 A | 12/1998 | Blum et al. | 510/197 |
| 5,977,042 A | 11/1999 | Hernandez et al. | 510/201 |
| 6,013,749 A * | 1/2000 | Baba et al. | 522/83 |
| 6,197,844 B1 * | 3/2001 | Hamrock et al. | 522/167 |
| 6,265,061 B1 * | 7/2001 | Kang et al. | 428/323 |
| 6,291,078 B1 * | 9/2001 | Chen et al. | 428/195 |
| 6,372,340 B1 | 4/2002 | Tominaga et al. | |
| 6,399,689 B1 | 6/2002 | Scarlette | 524/430 |
| 6,444,134 B1 | 9/2002 | Holman et al. | 216/29 |

FOREIGN PATENT DOCUMENTS

| | | |
|---|---|---|
| EP | 0 424 007 | 4/1991 |
| EP | 0 437 327 A2 | 4/1991 |
| EP | 0 424 645 | 5/1991 |
| EP | 0 486 196 | 5/1992 |
| GB | 2 173 508 A | 10/1986 |
| WO | WO 94/22965 | 10/1994 |
| WO | WO 97/18285 | 5/1997 |
| WO | WO 98/11168 | 3/1998 |

OTHER PUBLICATIONS

'Floor Coverings' page printed from Maple Homes Canada website (www.maplehomes.com) on Aug. 31, 2000.

"Ludox®—What is?" printed from DuPont Silica Products page (www.dupont.com/silica) on May 3, 2000.

Monospher® Technical Data Sheet, E. Merck, Germany (1994).

"Abrasion and Scratch Resistant UV–cured Clearcoats Using Colloidal Silica Acrylates," by C. Vu et al., presented at Radtech Conference, Baltimore 2000.

'Prefinished Flooring' page printed from Wood Flooring America website (www.woodflooringamerica.com) on Sep. 27, 2000.

Product literature re HIGHLINK® OG Silica Organosols, Clariant (France) S.A. (2000).

Product Information Sheet, "Solder Seal® Gunk® Hydroseal II Heavy Duty Cold Parts Cleaner," Radiator Specialty Company, Charlote, NC (Mar. 1997).

Material Safety Data Sheet for 'Upper Limits,' Spartan Chemical Company, Inc., Jan. 12, 1990.

Material Safety Data Sheet for 'Hydro Seal II Heavy Duty Cold Parts Cleaner,' Radiator Specialty Company, Aug. 1998.

* cited by examiner

SCRATCH-RESISTANT STRIPPABLE FINISH

TECHNICAL FIELD

This invention relates to scratch-resistant finishes, strippable finishes, and methods for applying and for removing a finish.

BACKGROUND

UV curable coating compositions typically provide a desirable combination of properties including rapid cure, high gloss and good durability. Due to these properties and their generally good scratch and detergent resistance, UV curable coating compositions have been used as floor finishes. For example, UV curable urethane coating compositions have been factory-applied to solid wood flooring to provide a pre-finished flooring material. Manufacturers of such pre-finished flooring materials regard such factory-applied coatings as having superior abrasion resistance compared to finishes that could be applied at a jobsite to installed flooring materials.

UV curable coating compositions have also been jobsite-applied to installed flooring materials. When these jobsite-applied UV cured floor finishes show the effects of wear, they require removal and renewal. However, current commercially available jobsite-applied UV cured floor finishes are generally regarded as not being strippable from the flooring material. Instead, more aggressive removal techniques such as floor sanding may be employed, thereby leading to removal of a portion of the underlying floor surface and creating dust issues at the jobsite. This has discouraged the use of jobsite-applied UV cured floor finishes.

SUMMARY OF THE INVENTION

A jobsite-applied floor finish desirably should exhibit very good wear resistance, but should be strippable so that it can be removed when worn. Strippability is desirable because in time almost all flooring materials can become sufficiently worn or dulled in appearance to warrant renewal or refinishing of the top surface of the flooring material.

Some manufacturers of factory-applied floor finish compositions have added aluminum oxide particles to UV curable urethane coating compositions for the stated purpose of increasing the abrasion resistance of the wear layer. Some manufacturers of small particle inorganic fillers have recommended the inclusion of various kinds of small particle inorganic fillers in general-purpose UV cured finish materials in order, inter alia, to increase abrasion or scratch resistance of the cured finish. However, these small particle inorganic filler manufacturers have typically also said that the small particles will also increase the chemical resistance of the cured finish. If added to a jobsite-applied UV curable floor finish, such a small particle addition would be expected to make the finish even more difficult to strip once it becomes worn. Because chemical strippability is already a problem for such jobsite-applied finishes, addition of small particle inorganic fillers to jobsite-applied UV curable floor finishes would be contraindicated.

Copending U.S. patent applications Ser. No. 09/560,170 filed Apr. 28, 2000, and Ser. No. 09/642,395 filed Aug. 18, 2000 now U.S. Pat. No. 6,472,024, describe strippable jobsite-applied UV curable floor finishes. We have found that the addition of inorganic filler particles to such finishes can provide a substantial increase in scratch resistance, without significantly decreasing (and in most cases actually increasing) strippability.

The present invention provides, in one aspect, a jobsite-applied floor finish atop a multipiece flooring material whose pieces have a top surface, a side surface or surfaces and gaps between pieces, the top surface being coated and at least the uppermost portion of the gaps being filled with a layer or layers of strippable cured finish composition comprising radiation cured polymer and sufficient inorganic filler particles to impart increased scratch resistance to the cured finish. The cured finish can be removed by applying to it an inhomogeneous stripper composition containing at least one polar solvent, allowing the stripper composition to contact the finish for sufficient time to soften the finish, and removing the softened finish from the flooring material by mopping, vacuuming, mild abrasion or other measures that do not remove substantial portions of the flooring material.

The present invention provides, in another aspect, a jobsite-applied finish atop a substrate material, wherein the finish comprises a strippable intermediate coating atop the substrate and a strip agent-permeable radiation cured coating atop the intermediate coating, the strip-agent permeable coating comprising sufficient inorganic filler particles to impart increased scratch resistance to the cured finish and being less strippable and more durable than the intermediate coating.

The present invention also provides a finish that can be factory-applied to flooring material pieces, thereby providing a factory-applied floor finish atop a multipiece flooring material whose pieces have a top surface coated with a layer or layers of a jobsite-strippable cured finish composition comprising a radiation cured coating comprising sufficient inorganic filler particles to impart increased scratch resistance to the finish.

The present invention also provides strippable radiation curable finish kits for jobsite application to flooring and other substrates, and methods for applying radiation curable finishes to flooring and other substrates.

The radiation curable finishes of the present invention exhibit scratch resistance comparable to that shown by a factory-applied finish (e.g., like the finish available on a so-called "no wax floor"), but remain strippable without damaging the underlying substrate.

DETAILED DESCRIPTION

Figure 1:
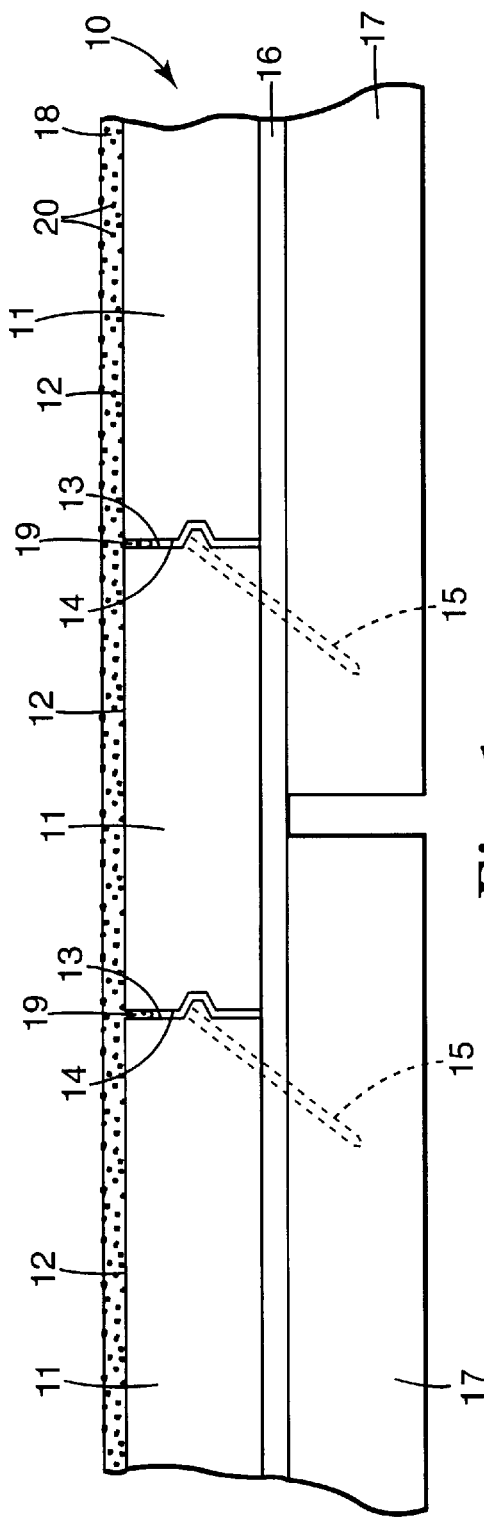
FIG. 1 shows a side view of a flooring material coated with a strippable single layer finish of the invention.

The finishes of the present invention can be applied to flooring materials or other substrates as one or more coats of the same material, or as one or more coats of different materials. In a preferred embodiment, the finishes of the present invention are in the form of a laminate comprising a strippable intermediate coating atop the substrate and a strip agent-permeable radiation cured coating atop the intermediate coating. Whether applied as one or as more than one coats of the same material, or two or more coats of different materials, the finishes of the present invention comprise at least one layer comprising inorganic particles. Preferably, the layer or layers comprising the inorganic layer is the topmost layer or the uppermost layers of the finish. The inorganic particles impart increased scratch resistance to the finish and help to protect any underlying layers and the substrate itself from abrasion, dirt, and other environmental effects. In the interest of brevity, the layer or layers comprising the inorganic particles will be referred to as the "topcoat". If desired, the topcoat may itself be overcoated with one or more additional layers of materials such as waxes, but these additional layers are optional and need not be discussed further.

As used in connection with this invention, a topcoat comprising inorganic particles is regarded as having increased scratch resistance when it exhibits a lower loss in total gloss, when evaluated using the Gardner Scratch Test set out below in Example 2, than a control finish that does not contain inorganic particles.

As used in connection with this invention, a finish is regarded as being "strippable" if when subjected to the action of a suitable strip agent, the finish can readily be removed from the substrate using simple, non-abrasive measures such as a mop and detergent solution, or mildly abrasive but substrate-non-damaging measures such as a nonwoven floor scrub pad. Strippability preferably is evaluated using the 7 point scale set out below in Example 1 and a strip agent containing a polar solvent such as benzyl alcohol.

As used in connection with this invention, a topcoat of a laminate finish is regarded as being "strip agent-permeable" if when coated atop the desired strippable intermediate coating and subjected to the action of a suitable strip agent, the strip agent permeates or otherwise penetrates the topcoat sufficiently so that the both the topcoat and strippable intermediate coating can be removed from the substrate. Strip agent permeability can be enhanced by a mechanically roughening the topcoat (using, for example, a nonwoven floor scrub pad, brush or other mild abrasive measure) just prior to stripping. A topcoat will be regarded as being strip agent-permeable even if such mechanical roughening is required, so long as the required mechanical roughening does not damage the underlying substrate.

As used in connection with this invention, a topcoat of a laminate finish is regarded as being more wear resistant than an underlying strippable intermediate coating when the topcoat exhibits lower weight loss than the underlying intermediate coating using a Taber Abrasion test conducted according to ASTM D4060-95.

A variety of substrates can be coated with the laminate finishes of the invention. For example, flooring materials that can be coated include resilient materials such as vinyl flooring, vinyl composite flooring, and synthetic sports floors; and non-resilient materials such as concrete, marble, wood, ceramic tile and grout, terrazzo, and polymeric substrates such as vinyl esters and polyesters. Other substrates that can be coated include walls, ceilings, labels, emblems, indoor and outdoor signs, and vehicles such as automobiles. The finishes can be applied at a variety of jobsites, including indoor and outdoor sites involving new or existing residential, commercial and government- or agency-owned sites.

The finishes of the present invention can be "jobsite-applied" to flooring or other multipiece substrates, especially wood substrates, after the substrate has been installed. They can be distinguished from "factory-applied" finishes that are applied to flooring or other multipiece substrates before the substrate is installed. This can be better understood by referring to FIG. 1, which shows an end view of multipiece flooring material 10 comprising floorboards 11. Each floorboard 11 has a top surface 12, sides surfaces 13 and 14, and additional side or end surfaces that are not shown in FIG. 1. Fasteners 15 (shown in phantom in FIG. 1) hold flooring material 10 in place on underlayment 16 and subfloor 17. UV cured topcoat 18 coats the top surfaces 12, and fills and seals at least the uppermost portions of the gaps 19 between each floorboard 11. Topcoat 18 contains small inorganic particles 20 which impart improved scratch resistance to topcoat 18. Because flooring material 10 was installed before it was finished, it was possible to sand the tops 12 of floorboards 11 so that they would be coplanar before topcoat 18 was applied, and to fill and seal the gaps 19 between floorboards 11. This enables flooring material 10 to have a better appearance and easier cleanability than would be the case if the flooring material had been factory-finished and then installed. In a factory-finished floor, there can be small differences in height between adjacent floorboards because it is not possible to sand the floorboards after installation without also removing at least some of the factory-applied finish. In a factory-finished floor, there are also small cracks between adjacent floorboards that are not filled or sealed by the factory-applied finish.

Figure 2:
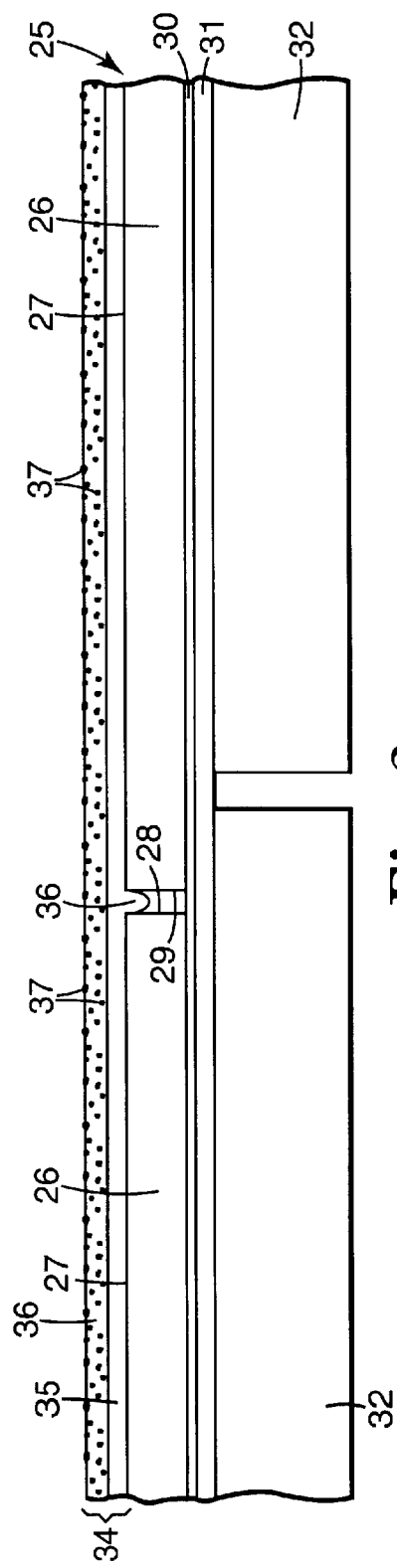
FIG. 2 shows a side view of a flooring material coated with a strippable laminate finish of the invention.

FIG. 2 shows an end view of multipiece flooring material 25 comprising vinyl tiles 26. Each tile 26 has a top surface 27, sides surfaces 28 and 29, and additional side or end surfaces that are not shown in FIG. 1. Adhesive 30 holds tiles 26 in place on underlayment 31 and subfloor 32. UV cured laminate finish 34 includes intermediate coating 35 atop the tiles 26 and a strip agent-permeable topcoat 36 atop the intermediate coating 35. Intermediate coating 35 coats the top surfaces 27, and fills and seals at least the uppermost portions of the gap 36 between each tile 26. Strip agent-permeable topcoat 36 contains small inorganic particles 37 which impart improved scratch resistance to finish 34.

A variety of radiation curable materials can be employed in the present invention. These materials can be cured using a variety of suitable energy sources such as UV, IR or electron beam energy. UV curing energy is preferred for jobsite finish applications. Radiation curable materials that are waterborne or otherwise substantially solvent free (e.g., 100 percent solids low viscosity formulations) are preferred for environmental reasons. Suitable radiation curable materials include urethanes, acrylates, methacrylates, unsaturated polyesters, vinyl ethers, epoxies and blends or copolymers thereof. Waterborne UV curable acrylates and urethanes are preferred. Particularly preferred materials are described in the above-mentioned copending U.S. patent applications Ser. No. 09/560,170, filed Apr. 28, 2000 and Ser. No. 09/642,395, filed Aug. 18, 2000, the disclosures of which are both incorporated by reference. Suitable commercially or experimentally available radiation curable materials include radiation curable acrylates, urethanes and urethane acrylates (including aliphatic polyester urethane acrylates) such as the materials designated as 935-63 through 935-67; 935-75B; 935-76 and 935-80 through 935-82 series of UV curable coatings from UV Coatings Limited; ROSHIELD™ 3120 UV curable acrylate coating from Rohm & Haas; NEORAD™ NR-3709 UV curable aliphatic urethane coating from Zeneca Resins; LAROMER™ PE 55W polyester acrylate, LR 8895 polyester acrylate, LR 8949 aliphatic urethane and LR 8983 aromatic urethane waterborne acrylic ester resins, all available from BASF Corp.; VIAKTIN™ VTE 6155 aliphatic urethane acrylate, VTE 6165 aromatic urethane acrylate and VTE 6169 aliphatic polyester urethane radiation curing resins, all available from Vianova Resins GmbH &Co. KG; 98-283W urethane acrylate, available from Hans Rahn & Co.; and materials such as those described in U.S. Pat. Nos. 5,453,451, 5,773,487 and 5,830, 937. If desired, two or more layers of different radiation curable materials can be employed in finishes of the invention, in order to optimize properties such as adhesion to the substrate or to a strippable intermediate coat, wear resistance, finish strippability, etc.

Suitable inorganic particles for use in the present invention include silicas and aluminas. Although the inorganic particles can if desired be obtained in dry powder form, preferably they are obtained in aqueous or solvent-based dispersions, as such dispersions are much more easily combined with radiation curable material. In general, solvent-based inorganic particle dispersions can easily be combined with both waterborne and solvent-borne radiation curable materials and generally provide good gloss and good film integrity in the cured finish. However, solvent-based inorganic particle dispersions tend to be more expensive than aqueous inorganic particle dispersions. When waterborne inorganic particle dispersions are combined with waterborne radiation curable materials, the resulting finish tends to have somewhat lower gloss and film integrity. We prefer to combine a waterborne inorganic particle dispersion with a suitable cosolvent that will dissolve in or be miscible with both water and the radiation curable material, and that will help to disperse the inorganic particles in the radiation curable material. The resulting mixture of waterborne inorganic particles and cosolvent can be combined with the radiation curable material and mixed using a suitable mixing device such as a sonic mixer.

Suitable inorganic particles are available in a wide variety of average particle diameters. Small diameter particles tend to provide better adhesion of the finish to the substrate, but also tend to be more expensive than large diameter particles. Large particles tend to provide better scratch resistance. Preferably, the average particle diameter is about 3 to about 50 nanometers, more preferably about 12 to about 50 nanometers. In some cases, use of a bimodal mixture of small and large diameter particles can provide a cured finish having an optimal balance of good coating properties, scratch resistance and durability.

Silicas are particularly preferred inorganic particles, especially for use in waterborne finishes. Suitable silicas include fumed silicas such as AEROSIL™ OX-50 (40 nanometer average particle diameter silica available from Degussa-Hüls AG) and CABOSIL™ M5 (available from Cabot Corp.); stabilized silica sols such as KLEBOSOL™ 30H25 (25 nm average particle diameter proton stabilized waterborne colloidal silica sol having a ph of 2.2 and a 30% solids content, available from Clariant Corp.), KLEBOSOL 30H50 (50 nm average particle diameter proton stabilized waterborne colloidal silica sol having a pH of 2.5 to 3.0 and a 30% solids content, available from Clariant Corp.), KLEBOSOL 30N12 (12 nm average particle diameter ammonium ion stabilized waterborne colloidal silica sol having a pH of 9.5 to 10.5 and a 30% solids content, available from Clariant Corp.), KLEBOSOL 30N25 (25 nm average particle diameter ammonium ion stabilized waterborne colloidal silica sol having a pH of 9.6 and a 30% solids content, available from Clariant Corp.), NALCO™ 1034A (20 nanometer average particle diameter acidic colloidal silica sol having a pH of 2.8 and a 34% solids content, available from Nalco Chemical Co.), NALCO 1130 (8 nanometer average particle diameter alkaline colloidal silica sol having a pH of 10.0 and a 30% solids content, available from Nalco Chemical Co.) and NALCO 1140 (15 nanometer average particle diameter alkaline colloidal silica sol having a pH of 9.4 and a 40% solids content, available from Nalco Chemical Co.); Silica organosols such as NALCO 1057 (20 nanometer average particle diameter colloidal silica sol having a 30% solids content in ethanol, available from Nalco Chemical Co.), HIGHLINK™ OG 1-32 (25 nm average particle diameter silica organosol having a 30% solids content in ethylene glycol, available from Clariant Corp.), HIGHLINK OG 401-31 (13 nm average particle diameter silica organosol having a 30% solids content in ethylene glycol mono n-propyl ether, available from Clariant Corp.) and HIGHLINK OG 401-51 (25 nm average particle diameter silica organosol having a 50% solids content in ethyleneglycol mono n-propyl ether, available from Clariant Corp.); colloidal silicas such as LUDOX™ AM, LUDOX AM-30 (12 nm average particle diameter aqueous silica sol having a 30% solids content), LUDOX AS, LUDOX HS40, LUDOX LS, LUDOX TM and LUDOX TMA (22 nm average particle diameter aqueous silica sol having a 34% solids:content), all available from DuPont Silica Products); and spherical silicas such as the MONOSPHER™ series available from EM Industries, Inc. Suitable aluminas include Aluminum Oxide C (available from Degussa-Hüls AG) and KLEBOSOL 30CAL25 alumina modified colloidal silica (available from Clariant Corp.)

The topcoat should contain sufficient inorganic particles to provide increased scratch resistance compared to a radiation cured finish that does not contain inorganic particles. If desired, large amounts of inorganic particles can be employed, so long as the other properties of the radiation curable finish are not unduly harmed by the thickening effect caused by addition of the inorganic particles to the radiation curable material. Preferably, the topcoat contains about 1 to about 40 weight percent inorganic particles based on the weight of solids in the radiation curable material. More preferably, the topcoat contains about 2 to about 20 weight percent inorganic particles, and most preferably about 5 to about 15 weight percent inorganic particles.

Exemplary photoinitiators which can be used in the topcoat include, but are not limited to, 1-phenyl-2-hydroxy-2-methyl-1-propanone; oligo {2-hydroxy-2 methyl-1-[4-(methylvinyl)phenyl]propanone}; 2-hydroxy 2-methyl 1-phenyl propan-1 one; bis(2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl) ketone; 2,2-dimethoxy-2-phenyl acetophenone; benzophenone; benzoic acid; (n-5,2,4-cyclopentadien-1-yl) [1,2,3,4,5,6-n)-(1-methylethyl) benzene]-iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE 500, commercially available from Ciba Specialty Chemicals); bis(n,5,2,4-cyclopentadien-1-yl)-bis[2,6-difluoro-3-(1H-pyrol-1-yl)phenyl]titanium (IRGACURE 784 DC, commercially available from Ciba Specialty Chemicals); 2-benzyl-2-N,N-dimethyl amino-1-(4-morpholinophenyl)-1-butanone (IRGACURE 369, commercially available from Ciba Specialty Chemicals); and the EB3, KB1, TZT, KIP 100F, ITX, EDB, X15 and KT37 series of ESACURE™ photoinitiators (commercially available from Sartomer Inc.). The topcoat should contain sufficient photoinitiator to facilitate the desired rate and degree of photocuring without unduly harming storage stability. Preferably, the topcoat contains about 0.05 to about 5 weight percent photoinitiator based on the weight of solids in the radiation curable material. More preferably, the topcoat contains about 0.1 to about 3 weight percent photoinitiator, and most preferably about 0.5 to about 2 weight percent photoinitiator.

When the finish is in the form of a laminate comprising the topcoat atop a strippable intermediate coat, a variety of intermediate coating materials can be employed. Suitable intermediate coating materials should be strippable using a strip agent that is capable of permeating the topcoat. Thus, the choice of intermediate coating material will be determined in part by the chosen topcoat and stripping agent. When the intermediate coating and topcoat are each coated alone on a vinyl composite tile substrate and evaluated using the 7 point scale set out below in Example 1, the intermediate coating desirably should have a higher strippability rating than the topcoat. Preferably, there will be at least a 1 point differential, more preferably at least a 2 point differential, and most preferably at least a 4 point differential in observed strippability rating values between the intermediate coating and topcoat. Waterborne intermediate coating materials are preferred for ease of application. Water-soluble acid-containing polymers crosslinked using transition metals (e.g., metal crosslinked acrylics) are a particularly preferred class of intermediate coating materials. These can be stripped using a variety of strip agents (described in more detail below) that dissolve the intermediate coating or attack the crosslinking site. Waterborne urethane-based finishes (optionally used without the crosslinkers normally employed with such finishes) are another preferred class of intermediate coating materials. Preferred intermediate coatings will have a rating of 6 or more, more preferably a rating of 7, when coated alone on a vinyl composite tile substrate and evaluated using the 7 point scale strippability set out below in Example 1. Suitable commercially available metal crosslinked acrylic polymers include GEMSTAR LASER™ and TAJ MAHAL™ acrylic finishes from Ecolab Inc.; HIGH NOON™ acrylic finish from Butchers; CITATION™ acrylic finish from Buckeye International, Inc., SIGNATURE™, VECTRA™, and COMPLETE™ acrylic finishes from S C Johnson Professional Products; UPPER LIMITS™ acrylic finish from Spartan Chemical Co.; and materials such as those described in U.S. Pat. Nos. 4,517,330 and 5,319,018 and the patents cited therein. Suitable-commercially available urethane finishes include COURT-MASTER II™ urethane finish from Ecolab Inc. Strippable floor coatings designated as "sealers" (e.g., OVER AND UNDER™ floor sealer, available from S. C. Johnson Professional Products) and strippable coatings based on polyvinylacetates can also be used. Blends of finishes (e.g., up to 50 weight percent of a radiation curable finish with less than 50 weight percent of a non-radiation curable finish) can also be employed as intermediate coating materials. If desired, two or more layers of different intermediate coatings can be employed in laminate finishes of the invention, in order to optimize properties such as adhesion to the substrate or to the topcoat, wear resistance, finish strippability, etc.

Suitable strip agents include compositions containing phenyl alcohols (e.g., benzyl alcohol); glycol ethers (e.g., propylene glycol methyl ether; phenoxy ethanol; phenoxy propanol; and ETHYL CARBITOL™, BUTYL CARBITOL™ and BUTYL CELLOSOLVE™, all available from Union Carbide Corp.); metasilicates; alkanolamines (e.g., monoethanolamine); and caustic agents such as sodium or potassium hydroxide. Compositions containing phenyl alcohols are preferred for stripping laminate finishes employing acrylate or urethane topcoats owing to the relatively high rate at which phenyl alcohols penetrate such topcoats and their ease of use and low odor.

A particularly preferred strip agent concentrate contains a polar solvent that is denser than water, and a sufficiently low level of cosolvent or surfactant so that upon mixing with water a pseudo-stable aqueous dispersion forms which will phase-separate following application to a surface, as described in copending U.S. patent application Ser. No. 09/641,775, filed Aug. 18, 2000, the disclosure of which is incorporated by reference.

Another preferred strip agent concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in copending application Ser. No. 09/383,000 filed Aug. 25, 1999, the disclosure of which is incorporated by reference.

Suitable commercially available strip agents include HAWK™, FREEDOM™ and CARE STRIP LOW ODOR™ stripper concentrates from Ecolab Inc.; JUGGERNAUT™ stripper concentrate from Buckeye International, Inc.; FULLER 3100™ Super Concentrate from H. B. Fuller, Inc. and TWIST AND FILL™ stripper concentrate from 3M.

The topcoat, strip agent (and intermediate coating, if employed) can contain a variety of adjuvants to alter the performance of properties of each component before or after application to a substrate. Useful adjuvants include leveling agents and other surface-active agents, defoamers, solvents to accelerate or to slow the drying rate, waxes, indicators, colorants optical brighteners, UVA absorbers, light stabilizers and antioxidants. The types and amounts of such adjuvants will be apparent to those skilled in the art.

The finish materials of the invention can be applied using a variety of methods, including spraying, brushing, roll coating and flood coating. Mop application is preferred for coating floors. Typically, the substrate should first be cleaned and any loose debris removed. One or more coats of the optional intermediate coating (diluted if necessary with water or another suitable solvent) are applied to the substrate, and allowed to dry. Three to five coats of the intermediate coating typically will be preferred for coating floors. When used on floors, each coat of the intermediate coating preferably will have a dry coating thickness of about 2.5 to about 75 micrometers, more preferably about 2.5 to about 20 micrometers, and the overall intermediate dry coating thickness preferably will be about 5 to about 150 micrometers, more preferably about 5 to about 40 micrometers.

Next, one or more coats of the topcoat (diluted if necessary with water or another suitable solvent) can be applied to the substrate (or to the optional intermediate coating if employed once the intermediate coating has dried to the touch). One to five coats of the topcoat typically will be preferred for coating floors. Each coat of the topcoat preferably is individually cured using a suitable radiation curing apparatus. When used on floors, each coat of the topcoat preferably will have a dry coating thickness of about 2.5 to about 75 micrometers, more preferably about 2.5 to about 20 micrometers, and the overall topcoat dry coating thickness preferably will be about 5 to about 150 micrometers, more preferably about 5 to about 40 micrometers. When used on floors, laminate finishes of the invention preferably will have an overall dry coating thickness of about 10 to about 300 micrometers, more preferably about 10 to about 80 micrometers.

The finish can thereafter receive normal maintenance until such time as it is desired to remove and renew the finish. The finish can be stripped by optionally abrading the topcoat with a suitably mild abrasive (e.g., a green or black SCOTCH-BRITE™ Floor Maintenance pad from 3M) and then applying a coating of the desired strip agent. The strip agent should be allowed to stand for a suitable time (e.g., for a minute or more, and typically between about 5 and about 20 minutes) while it permeates through the topcoat (and in case of the laminate finish, while it attacks the intermediate coating). After the finish softens sufficiently, it can be removed using a variety of techniques including vacuuming, mopping or wiping. Removal will usually be made easier if water or a suitable detergent solution is applied to the softened finish. The substrate can be allowed to dry and new layers of the optional intermediate coat and the topcoat can be applied to renew the finish.

The finishes of the invention typically will be sold in the form of a kit containing the optional intermediate coating and the topcoat in containers (e.g., separate containers) together with suitable directions for carrying out the methods of the invention. If desired, the intermediate coating or topcoat could be packaged as concentrates intended to be mixed with water or another suitable solvent at about a 15–40% solids level. Optionally the kit will include a container of the strip agent. The strip agent typically will be mixed with water or another suitable solvent at about 5–30% by weight. The kit can also contain undercoat materials (e.g., leveling coatings) that can be applied to the substrate before application of the optional intermediate coating or the topcoat, and overcoat materials (e.g., wax finishes) that can be applied atop the topcoat.

If desired, the finishes of the invention can be factory-applied to provide a jobsite-strippable floor finish atop a multipiece flooring material. The flooring material pieces will have a top surface coated with a layer or layers of a jobsite-strippable cured finish composition comprising a radiations cured coating comprising sufficient inorganic filler particles to impart increased scratch resistance to the finish. Such a finish can be a laminate employing an intermediate coating and topcoat as described above. If desired, the side or bottom surfaces of the flooring pieces can be coated or partially coated with finishes of the invention.

The invention is further illustrated in the following non-limiting examples, in which all parts and percentages are by weight unless otherwise indicated.

EXAMPLE 1

150 mm square uncoated black vinyl composite floor tiles, from Armstrong Tile were scratched with a nonwoven abrasive scrub pad (SCOTCH-BRITE green abrasive, 3M) until the tile surface was no longer shiny and then coated with a single thick coat containing 3.5 g of a UV curable finish made from the following ingredients and labeled as "Formulation 1":

| Ingredient | Parts |
| --- | --- |
| VIAKTIN VTE 6165 resin[1] | 42.86 |
| IRGACURE 500 photoinitiator[2] | 1.57 |
| Wax 325 polymer emulsion[3] | 1.05 |
| Wax 43N polymer emulsion[3] | 1.05 |
| PI-35 defoamer[4] | 0.1 |

-continued

| Ingredient | Parts |
| --- | --- |
| FC-120 fluorosurfactant[5] | 0.05 |
| Deionized water | 53.32 |

[1]Aromatic urethane acrylate radiation curing resin, available from Vianova Resins GmbH & Co. KG.
[2]Available from Ciba-Geigy Company.
[3]Available from Emulsion Systems, Inc.
[4]Available from Ultra Additives, Inc.
[5]Available from 3M.

The coated tiles were passed through a UV curing apparatus containing an H bulb mercury vapor lamp operated at 1.94 joule/sec per $cm^2$ and 4.9 meters per minute, and allowed to stand for three days. The coated tiles (which did not employ a topcoat containing inorganic filler particles) were labeled as "Control A".

Three colloidal silica sols (KLEBOSOL 3OH25, LUDOX AM-30 and HIGHLINK OG 401-31) were added separately to Formulation 1 in amounts sufficient to provide compositions containing 10% inorganic particle solids based on the total weight of the finish. The particles were mixed into the finish by stirring for one minute using a Model CP-130 ultrasonic stirring apparatus (available from Cole-Palmer Instrument Co.). Using the method employed for the Control A tiles, a single thick 3.5 g coat of each inorganic particle-containing finish was applied to the scratched tiles, cured and allowed to stand for three days. The coated tiles were labeled as Example 1-1, 1-2 and 1-3.

A stripper composition was prepared by combining 75 wt. % benzyl alcohol, 7.5 wt. % diethylene glycol monobutyl ether, 7.5 wt. % dipropylene glycol N-butyl ether, 7.5 wt. % propylene glycol phenyl ether and 2.5 wt. % SURFONIC™ 24-9 ethoxylated alcohol (Huntsman Chemical) to form a concentrate, and combining 10 parts of the resulting concentrate with 3 parts monoethanolamine and 87 parts water. The resulting diluted stripper composition forms a pseudo-stable aqueous dispersion when stirred. Shortly after application of the diluted stripper composition to a surface, the composition undergoes phase separation to form a solvent layer containing primarily benzyl alcohol adjacent to the surface with a layer containing primarily water atop the solvent layer. The diluted stripper composition was labeled as "Strip Agent A".

A 50 mm diameter by 38 mm high carbon steel cylinder with a weight of 571 grams was wrapped with a green nonwoven pad (SCOTCH-BRITE Floor Maintenance Disc, 3M). When rolled over a coated tile, the cylinder exerted a pressure of 2.8 kPa and mimicked the pressure applied by a standard electric floor burnisher. The coated tiles were placed on a level surface and flooded with a sufficient quantity of Strip Agent A to form a 50 mm diameter circular pool on the surface of the coated tiles. Strip Agent A was allowed to remain on the coated tiles for 10 minute or 20 minute standing times. The cylinder was then rolled 10 times over each tile. The tiles were rinsed with tap water, blotted dry and their strippability rated according to the following scale:

1) No effect
2) Minimal chemical attack on finish
3) Moderate chemical attack on finish
4) Severe chemical attack on finish with onset of stripping
5) Incomplete strip (may strip completely in some areas, especially where finish was porous, but not in other areas. Finish is slightly soft or tacky)

6) Incomplete strip with softened finish in all areas

7) Complete strip

Set out below in Table 1 are the identity of each coated tile, identity of the inorganic filler particles (if any) contained in the finish, and the strippability rating for 10 minute and 20 minute strip agent standing times:

TABLE 1

| Tile | Inorganic Particles | Strippability, 10 Minute Standing Time | Strippability, 20 Minute Standing Time |
| --- | --- | --- | --- |
| Control A | None | 2 | 5 |
| Example 1-1 | KLEBOSOL 30H25 acidic sol | 6 | 7 |
| Example 1-2 | LUDOX AM-30 aqueous sol | 4 | 6 |
| Example 1-3 | HIGHLINK 401-31 organosol | 3 | 6 |

The results in Table 1 show that the finish compositions of the invention exhibited better strippability (and thus were less resistant to chemical attack) than finish compositions that did not contain inorganic particles.

Example 2

Using the method of Example 1, laminate finish compositions were prepared and applied to black vinyl composite floor tiles. A single thick coat containing 3.5 g of a waterborne metal-catalyzed acrylic floor finish (GEMSTAR LASER, Ecolab Inc.) was applied to the scratched tiles at a 20% solids level and allowed to air dry to form a strippable intermediate coating. Each coated tile was placed in an oven for 15 minutes at 60° C. to insure that the intermediate coating was dry. Tiles coated only with this acrylic floor finish can readily be completely stripped (yielding a strippability rating of 7) in less than 10 minutes using Strip Agent A.

Samples of the oven-dried coated tiles were coated with Formulation 1, cured using UV radiation and allowed to stand for 3 days as in Example 1. The resulting laminate-coated tiles employed a strippable intermediate coating but not a topcoat containing inorganic particles. These tiles were set aside and labeled as "Control B".

The remaining samples of the oven-dried coated tiles were coated with UV curable finishes made by combining Formulation 1 with various inorganic particles in amounts sufficient to provide 10 wt. % particles in the cured finish. The particles employed are set out below in Table 2. Each finish was applied in a single thick coat containing 3.5 g of the finish, cured using UV radiation and allowed to stand for 3 days. The coated tiles were labeled as Example 2-1 through Example 2-15 and evaluated for strippability using the method of Example 1.

Using the method of Example 1, three 3.5 g coats of Formulation 1 were separately applied to scratched black vinyl composite floor tiles, cured using UV radiation and allowed to stand for three days. Twelve samples of the Control B tiles and six samples of each of the Example 2-1 through Example 2-13 coated tiles were evaluated for scratch resistance using the Gardner scratch test. This test is performed by measuring the initial gloss levels of the coated tiles using a MICRO-TRI GLOSS™ Tester, available from Byk Gardner Inc. Each tile sample is then abraded for 100 back and forth cycles across the surface of the coated tile using a wet green nonwoven pad (SCOTCH-BRITE Floor Maintenance Disc, 3M) mounted to project approximately 13 mm below the brush holder of a Gardner Abrasive Tester laboratory scrubbing machine. Water was added to the surface of each tile after the second or third abrasion cycle. Following the completion of 100 cycles, the tile sample was removed from the machine, rinsed and dried. The gloss level after abrasion was then measured.

Set out below in Table 2 are the identity of each coated tile, identity of the inorganic filler particles (if any) contained in the topcoat, and the strippability rating for 10 minute and 20 minute strip agent standing times. Set out below in Table 3 are the identity of each coated tile, identity of the inorganic filler particles (if any) contained in the topcoat, initial gloss, gloss after abrasion and gloss lost:

TABLE 2

| Tile | Inorganic Particles | Strippability, 10 Min. Standing Time | Strippability, 20 Min. Standing Time |
| --- | --- | --- | --- |
| Control B | None | 4.5 | 5 |
| 2-1 | NALCO 1130 | 5 | 6 |
| 2-2 | NALCO 1140 | 7 | 7 |
| 2-3 | NALCO 1034A | 6 | 7 |
| 2-4 | NALCO 1057 | 6 | 6 |
| 2-5 | KLEBOSOL 30H25 | 6 | 6 |
| 2-6 | KLEBOSOL 30N25 | 6 | 6 |
| 2-7 | KLEBOSOL 30H50 | 6 | 7 |
| 2-8 | KLEBOSOL 30N12 | 6 | 6 |
| 2-9 | LUDOX AM-30 | 7 | 6 |
| 2-10 | LUDOX TMA | 6 | 6 |
| 2-11 | HIGHLINK 401-31 | 5 | 6 |
| 2-12 | HIGHLINK 401-51 | 5 | 6 |
| 2-13 | HIGHLINK 1-32 | 7 | 7 |
| 2-14 | CABOSIL M5 | 6 | 7 |
| 2-15 | AEROSIL OX-50 | 6 | 6 |

TABLE 3

| Tile | Inorganic Particles | Initial Gloss | Final Gloss | Gloss Lost |
| --- | --- | --- | --- | --- |
| Control B | None | 93.2 | 24.0 | 69.2 |
| 2-1 | NALCO 1130 | 94.3 | 88.7 | 5.6 |
| 2-2 | NALCO 1140 | 92.0 | 90.6 | 1.4 |
| 2-3 | NALCO 1034A | 90.4 | 89.8 | 0.6 |
| 2-4 | NALCO 1057 | 94.9 | 90.2 | 4.7 |
| 2-5 | KLEBOSOL 30H25 | 91.0 | 88.3 | 2.7 |
| 2-6 | KLEBOSOL 30N25 | 92.9 | 91.9 | 1.0 |
| 2-7 | KLEBOSOL 30H50 | 96.0 | 89.8 | 6.2 |
| 2-8 | KLEBOSOL 30N12 | 94.2 | 91.0 | 3.2 |
| 2-9 | LUDOX AM-30 | 96.4 | 93.1 | 3.3 |
| 2-10 | LUDOX TMA | 93.6 | 91.4 | 2.2 |
| 2-11 | HIGHLINK 401-31 | 94.9 | 93.7 | 1.2 |
| 2-12 | HIGHLINK 401-51 | 93.4 | 87.9 | 5.5 |
| 2-13 | HIGHLINK 1-32 | 94.2 | 93.9 | 0.3 |

The results in Table 2 show that laminate finish compositions of the invention based on aqueous sols exhibited generally better strippability than the comparable finish compositions of Example 1. In addition, the laminate finish compositions of the invention exhibited better strippability (and thus were less resistant to chemical attack) than laminate finish compositions that did not contain inorganic particles. The results in Table 3 show that the laminate finish compositions provided significantly better scratch resistance than laminate finish compositions that did not contain inorganic particles.

EXAMPLE 3

Three strip agents were prepared as follows:

Strip Agent B

A stripper composition was prepared by combining 48.5% benzyl alcohol, 41.25% monoethanolamine, 10.1% dinonylphenol ethoxylate (with an average of 10 EO units), and 0.15% FLUORAD™ FC-120 fluorinated wetting agent (3M) to form a concentrate, and combining 20 parts of the resulting concentrate with 80 parts water. The resulting diluted stripper composition forms a pseudo-stable aqueous dispersion when stirred. Shortly after application of the diluted stripper composition to a surface, the composition undergoes phase separation to form a solvent layer containing primarily benzyl alcohol adjacent to the surface with a layer containing primarily water atop the solvent layer. The diluted stripper composition was labeled as "Strip Agent B".

Strip Agent C

A stripper composition was prepared by combining 49% benzyl alcohol, 17% monoethanolamine, 24% water and 10% sodium decyldiphenyl ether disulfonate to form a concentrate, and combining 20 parts of the resulting concentrate with 80 parts water. The resulting diluted stripper composition forms a pseudo-stable aqueous dispersion when stirred. Shortly after application of the diluted stripper composition to a surface, the composition undergoes phase separation to form a solvent layer containing primarily benzyl alcohol adjacent to the surface with a layer containing primarily water atop the solvent layer. The diluted stripper composition was labeled as "Strip Agent C".

Strip Agent D

A stripper composition was prepared by combining 54.45% softened water, 15% sodium xylene sulfonate (40% in water), 10% potassium hydroxide (45% in water), 10% monoethanolamine, 0.5% tetrasodium EDTA (40% in water), 10% ethylene glycol phenyl ether and 0.05% fluorosurfactant (FLUORAD FC-129, 3M) to form a concentrate, and combining 20 parts of the resulting concentrate with 80 parts water. The resulting diluted stripper composition forms a stable aqueous dispersion that remains so after it is applied. The diluted stripper composition was labeled as "Strip Agent D".

Strip Agents A through D were applied to samples of the Control B tiles and samples of the laminate coated tiles of Example 2-11 to evaluate strippability using the method of Example 2. Set out below in Table 4 are the identity of each coated tile, identity of the Strip Agent, and the strippability rating for a 20 minute standing time.

TABLE 4

| Strip Agent | Strippability, Control B Tile | Strippability, Example 2-11 Tile |
|---|---|---|
| Strip Agent A | 7 | 7 |
| Strip Agent B | 6.5 | 7 |
| Strip Agent C | 6.5 | 7 |
| Strip Agent D | 1.5 | 2 |

The results in Table 4 show that a laminate finish composition of the invention could be stripped using several strip agents, and that the strippability rating for a laminate finish composition of the invention was generally the same as or better than the strippability rating of a control finish that did not contain inorganic particles.

EXAMPLE 4

Using the method of Example 2, two scratched black vinyl composite tiles were coated with a single thick coat containing 3.5 g of a waterborne uncrosslinked urethane acrylic floor finish (COURTMASTER II, Ecolab Inc., used as is without addition of catalyst) at a 25% solids level and allowed to air dry to form a strippable intermediate coating. Each coated tile was placed in an oven for 15 minutes at 60° C. to insure that the intermediate coating was dry. One of the tiles was overcoated with a single thick coat containing 3.5 g of an 89% solids UV curable finish made from the following ingredients and labeled as "Formulation 2":

| Ingredient | Parts |
|---|---|
| VIAKTIN VTE 6165-48W resin[1] | 82 |
| ACEMATT ™ TS 100 silica[2] | 2.5 |
| IRGACURE 500 photoinitiator[3] | 1.8 |
| DREWPLUS ™ L-475 defoamer[4] | 1 |
| BYK ™ 333 dimethylpolysiloxane[5] | 0.5 |
| BYK 346 wetting agent[6] | 0.5 |
| DISPERBYK ™ 190 wetting and dispersing agent[7] | 0.5 |
| DREWPLUS L-405 defoamer[8] | 0.1 |
| FLUORAD FC-120 fluorosurfactant[9] | 0.1 |
| Deionized water | 11 |

[1]Aromatic urethane acrylate radiation curing resin, available from Vianova Resins GmbH & Co. KG.
[2]Available from Degussa-Hüls AG.
[3]Available from Ciba-Geigy Company.
[4]Mixture of 40–50% petroleum hydrocarbon, 39–49% aliphatic petroleum distillates and 6–10% silica, available from Drew Industrial Div. of Ashland Chemical Co.
[5]Polyether modified dimethylpolysiloxane surface tension reduction agent, available from BYK-Chemie GmbH.
[6]Available from BYK-Chemie GmbH.
[7]Polyfunctional polymer with anionic/ionic character, available from BYK-Chemie GmbH.
[8]Mixture of 40–55% surfactant, 25–40% silicone, 9% butyl glycol and 1–10% silica, available from Drew Industrial Div. of Ashland Chemical Co.
[9]Available from 3M.

This laminate coated tile (which did not employ a topcoat containing inorganic filler particles) was labeled as "Control C".

The other coated tile was coated with a single thick coat of a UV curable finish made by adding 5 wt. % aluminum oxide inorganic particles ("Aluminum Oxide C", available from Degussa-Hüls AG) to Formulation 2 using ultrasonic stirring, followed by dilution with sufficient xylene to bring the overall solids level to 30%. This laminate-coated file was labeled as "Example 4".

Using the method of Example 1, each laminate-coated tile was evaluated for strippability using Strip Agent A and a 10 minute standing time. The tile of Example 4 exhibited a strippability rating of 7, whereas the tile of Control C exhibited a strippability rating of 6. This shows that a laminate finish composition of the invention exhibited better strippability (and thus was less resistant to chemical attack) than a laminate finish composition that did not contain aluminum oxide particles.

EXAMPLE 5

Five coats containing 1.9 g of a waterborne metal-catalyzed acrylic floor finish (GEMSTAR LASER, Ecolab Inc.) were applied to scratched black vinyl composite tiles at a 20% solids level and allowed to air dry. Each coated tile was placed in an oven for 15 minutes at 60° C. to insure that the coating was dry, then labeled as "Control D".

Two coats containing 1.9g of the same waterborne metal-catalyzed acrylic floor finish were applied to scratched black vinyl composite tiles at a 20% solids level and allowed to air dry. Each coated tile was placed in an oven for 15 minutes at 60° C. to insure that the coating was dry. A UV curable finish was made from the following ingredients and labeled as "Formulation 3":

| Ingredient | Parts |
|---|---|
| VIAKTIN VTE 6169 resin[1] | 42.86 |
| IRGACURE 500 photoinitiator | 1.57 |
| Wax 325 polymer emulsion | 0.53 |
| Wax 43N polymer emulsion | 1.58 |
| PI-35 defoamer | 0.1 |
| FLUORAD FC-120 fluorosurfactant | 0.05 |
| Deionized water | 53.32 |

[1]Aliphatic polyester urethane radiation curing resins, available from Vianova Resins GmbH & Co. KG.

Varying quantities of HIGHLINK OG 401-31 colloidal silica were added to Formulation 3 and to Formulation 1, applied in two coats containing 1.9 g of finish atop the two previously-applied dry coats of waterborne metal-catalyzed acrylic floor finish and cured using UV radiation and the method of Example 1. The coated tiles were labeled as Example 5-1 through 5-8. The Control D tiles and the tiles of Example 5-1 through 5-8 were evaluated for strippability using the method of Example 1 and a strip agent prepared by adding 0.15 wt. % FLUORAD FC-120 fluorosurfactant to Strip Agent C. The strip agent was allowed to stand on the coated tiles for a 10 minute standing time. The coated tiles were also aged 4 days and then evaluated for scratch resistance using the Gardner testing machine used in Example 2, but using a five point scale to evaluate scratch resistance. A rating of 1 was assigned to tested tiles exhibiting scratch resistance equivalent to the Control D tiles, a rating of 5 was assigned to tested tiles exhibiting no apparent scratching after 100 back and forth abrasion testing cycles, and values of 2 to 4 were assigned to tested tiles exhibiting degrees of scratch resistance intermediate between the end points.

Set out below in Table 5 is the identity of each coated tile, identity of the finish formulation, amount of inorganic filler particles (if any) contained in the finish formulation, strippability rating and scratch resistance rating for each tile:

TABLE 5

| Tile | Formulation | Wt. % Particles | Strippability | Scratch Resistance |
|---|---|---|---|---|
| Control D |  | None | 7 | 1 |
| 2-1 | 1 | None | 6 | 1.5 |
| 2-2 | 1 | 10% | 6 | 4 |
| 2-3 | 1 | 15% | 7 | 4 |
| 2-4 | 1 | 20% | 6 | 4 |
| 2-5 | 2 | None | 6 | 3.5 |
| 2-6 | 2 | 10% | 6 | 4 |
| 2-7 | 2 | 15% | 6 | 4 |
| 2-8 | 2 | 20% | 6 | 4.5 |

The results in Table 5 show that show that finish compositions of the invention containing differing levels of inorganic particles exhibited strippability ratings that were the same as or better than the strippability ratings of UV cured finishes that did not contain inorganic particles. The finish compositions of the invention also exhibited improved scratch resistance compared to UV cured finishes that did not contain inorganic particles and compared to a control finish that was not UV cured.

Various modifications and alterations of this invention will be apparent to those skilled in the art without departing from the scope and spirit of this invention. It should be understood that this invention is not limited to the illustrative embodiments set forth above.

We claim:

1. A jobsite-applied floor finish atop a multipiece flooring material whose pieces have a top surface, a side surface or surfaces and gaps between pieces, the top surface being coated and at least the uppermost portion of the gaps being filled with a layer or layers of a waterborne finish composition comprising radiation cured polymer and sufficient inorganic filler particles to impart increased scratch resistance to the finish after cure but be jobsite-strippable.

2. A finish according to claim 1, wherein the finish is strippable by applying an inhomogeneous stripper composition containing at least one polar solvent, allowing the stripper composition to contact the finish for sufficient time to soften the finish, and removing the softened finish from the flooring material by mopping, vacuuming, mild abrasion or other measures that do not remove substantial portions of the flooring material.

3. A finish according to claim 1, wherein the inorganic particles comprise silica or alumina particles.

4. A finish according to claim 1, wherein the inorganic particles comprise silica particles.

5. A finish according to claim 1, wherein the inorganic particles have an average particle diameter of about 3 to about 50 nanometers.

6. A finish according to claim 1, wherein the inorganic particles have an average particle diameter of about 12 to about 50 nanometers.

7. A finish according to claim 1, wherein the inorganic particles comprise a bimodal mixture of small and large diameter particles.

8. A finish according to claim 1, comprising about 1 to about 40 weight percent inorganic particles based on the weight of cured finish.

9. A finish according to claim 1, comprising about 5 to about 15 weight percent inorganic particles based on the weight of cured finish.

10. A jobsite-applied finish atop a substrate, wherein the finish comprises a strippable intermediate coating atop the substrate and a radiation cured waterborne coating atop the intermediate coating, the waterborne coating comprising radiation cured polymer and sufficient inorganic filler particles to impart increased scratch resistance to the finish after cure but be jobsite-strippable, the radiation cured coating being strip agent-permeable, less strippable and more durable than the intermediate coating.

11. A finish according to claim 10, wherein the finish is strippable by applying to it an inhomogeneous stripper composition containing at least one polar solvent, allowing the stripper composition to contact the finish for sufficient time to soften the finish, and removing the softened finish from the substrate by mopping, vacuuming, mild abrasion or other measures that do not remove substantial portions of the substrate.

12. A finish according to claim 10, wherein the substrate comprises a floor.

13. A finish according to claim 10, wherein the substrate comprises a resilient flooring material.

14. A finish according to claim 10, wherein the substrate comprises a multipiece flooring material.

15. A finish according to claim 14, wherein the pieces have a top surface, a side surface or surfaces and gaps between pieces, the top surface being coated and at least the uppermost portion of the gaps being filled with a layer or layers of the intermediate coating.

16. A finish according to claim 15, wherein the substrate comprises vinyl or vinyl composite tiles.

17. A finish according to claim 15, wherein the substrate comprises wood.

18. A finish according to claim 10, wherein the intermediate coating comprises a metal-catalyzed acrylic.

19. A finish according to claim 10, wherein the intermediate coating has a thickness of about 2.5 to about 75 micrometers.

20. A finish according to claim 10, wherein the radiation cured waterborne coating comprises an acrylate, methacrylate, unsaturated polyester, vinyl ether, epoxy, urethane or acrylated urethane.

21. A finish according to claim 10, wherein the radiation cured waterborne coating comprises a UV cured aromatic urethane.

22. A finish according to claim 10, wherein the radiation cured waterborne coating comprises a UV cured aliphatic polyester urethane.

23. A finish according to claim 10, wherein the radiation cured waterborne coating has a thickness of about 2.5 to about 75 micrometers.

24. A finish according to claim 10, wherein the inorganic particles comprise silica or alumina particles.

25. A finish according to claim 10, wherein the inorganic particles comprise silica particles.

26. A finish according to claim 10, wherein the inorganic particles have an average particle diameter of about 3 to about 50 nanometers.

27. A finish according to claim 10, wherein the inorganic particles have an average particle diameter of about 12 to about 50 nanometers.

28. A finish according to claim 10, comprising about 1 to about 40 weight percent inorganic particles based on the weight of the radiation cured waterborne coating.

29. A finish according to claim 10, comprising about 5 to about 15 weight percent inorganic particles based on the weight of the radiation cured waterborne coating.

30. A factory-applied floor finish atop a multipiece flooring material whose pieces have a top surface coated with a layer or layers comprising a radiation cured waterborne coating comprising sufficient inorganic filler particles to impart increased scratch resistance to the finish but be jobsite-strippable.

31. A finish according to claim 30, wherein the cured finish is strippable by applying to it an inhomogeneous stripper composition containing at least one polar solvent, allowing the stripper composition to contact the finish for sufficient time to soften the finish, and removing the softened finish from the flooring material by mopping, vacuuming, mild abrasion or other measures that do not remove substantial portions of the flooring material.

32. A finish according to claim 30, further comprising a layer or layers of a strippable intermediate coating between the flooring material and the radiation cured waterborne coating, wherein the radiation cured coating is strip-agent permeable, less strippable and more durable than the intermediate coating.

33. A finish according to claim 30, wherein the inorganic particles comprise silica or alumina particles.

34. A finish according to claim 30, wherein the inorganic particles comprise silica particles.

35. A finish according to claim 30, wherein the inorganic particles have an average particle diameter of about 3 to about 50 nanometers.

36. A finish according to claim 30, wherein the inorganic particles have an average particle diameter of about 12 to about 50 nanometers.

37. A finish according to claim 30, wherein the inorganic particles comprise a bimodal mixture of small and large diameter particles.

38. A finish according to claim 30, comprising about 1 to about 40 weight percent inorganic particles based on the weight of radiation cured coating.

39. A finish according to claim 30, comprising about 5 to about 15 weight percent inorganic particles based on the weight of radiation cured coating.

40. A finish according to claim 30, wherein the flooring material comprises wood.

\* \* \* \* \*

UNITED STATES PATENT AND TRADEMARK OFFICE
CERTIFICATE OF CORRECTION

PATENT NO. : 6,800,353 B1
DATED : October 5, 2004
INVENTOR(S) : Bryan M. Anderson et al.

It is certified that error appears in the above-identified patent and that said Letters Patent is hereby corrected as shown below:

Column 9,
Line 39, delete "radiations" and insert therefor -- radiation --

Signed and Sealed this

Fifth Day of July, 2005

JON W. DUDAS
*Director of the United States Patent and Trademark Office*